US010783338B2

(12) United States Patent
Mani et al.

(10) Patent No.: US 10,783,338 B2
(45) Date of Patent: Sep. 22, 2020

(54) INTEGRATED ACCESS CONTROL SYSTEM

(71) Applicant: Amazon Technologies, Inc., Seattle, WA (US)

(72) Inventors: Kaushik Mani, Seattle, WA (US); Dushyant Rao Chegoori, Santa Clara, CA (US); Carl Haverl, Aptos, CA (US); Prakash Krishnamurthy, Sammamish, WA (US); Ahmet Musabeyoglu, Sunnyvale, CA (US); Peeyush Champalal Nahar, Sammamish, WA (US); Taru Roy, Mountain View, CA (US); Parathan Sivagnanasundaram, Campbell, CA (US); Hoshgeldy Tachmuradov, Soquel, CA (US); Ziyi Zhang, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/916,103

(22) Filed: Mar. 8, 2018

(65) Prior Publication Data
US 2019/0278955 A1 Sep. 12, 2019

(51) Int. Cl.
*G06K 7/10* (2006.01)
*G06F 21/31* (2013.01)
(Continued)

(52) U.S. Cl.
CPC ......... *G06K 7/10366* (2013.01); *G06F 21/31* (2013.01); *G07C 9/00309* (2013.01); *G07C 9/33* (2020.01)

(58) Field of Classification Search
CPC .......... G06F 21/31; G06F 21/32; G06F 21/34; G06K 7/087; G06K 7/10366;
(Continued)

(56) References Cited

U.S. PATENT DOCUMENTS 5,194,855 A * 3/1993 McCaslin ............... G06F 21/82
340/5.65
6,243,577 B1 * 6/2001 Elrefaie ............... H04W 84/14
455/15
(Continued)

FOREIGN PATENT DOCUMENTS

CN 102067145 5/2011
CN 104157029 11/2014
(Continued)

OTHER PUBLICATIONS

U.S. Appl. No. 15/595,840, filed May 15, 2017, Titled: Universal Access Control Device.
(Continued)

*Primary Examiner* — Yong Hang Jiang
(74) *Attorney, Agent, or Firm* — Kilpatrick Townsend & Stockton LLP

(57) ABSTRACT

Described herein is a system for controlling access to a physical location. In some embodiments, a user device may provide user credentials to an input device of the access system. The input device may transmit the user credentials to a splitter, in some examples, permit access to the physical location via an access control board. In other examples, the input device may transmit the user credentials from a splitter to a network-connected gateway and then permit access to the physical location via the access control board. In either example, the power and signal wires may be reused for the splitter and/or network-connected gateway. The access control board may be coupled with an electrically-controlled device and configured to allow access to the physical location with one or more electronic signals to the electrically-controlled device. The electrically-controlled device may allow access when the user credentials are authenticated by the system.

16 Claims, 13 Drawing Sheets

(51) Int. Cl.
*G07C 9/00* (2020.01)
*G07C 9/33* (2020.01)

(58) Field of Classification Search
CPC ............ G07C 9/00087; G07C 9/00309; G07C 9/00563; G07C 9/00571; G07C 9/0069; G07C 9/00722; G07C 9/00857; G07C 9/00904; G07C 9/00142; H04W 4/80
USPC ....... 340/5.6, 5.61, 5.64, 5.65, 5.66, 5.7, 5.8
See application file for complete search history.

(56) References Cited

U.S. PATENT DOCUMENTS

| | | | | |
|---|---|---|---|---|
| 8,237,570 | B1* | 8/2012 | Parekh | G06K 7/10207 340/333 |
| 8,443,425 | B1 | 5/2013 | Evans et al. | |
| 9,148,416 | B2 | 9/2015 | Tse | |
| 9,264,426 | B2* | 2/2016 | Buer | H04L 9/3234 |
| 9,805,370 | B1 | 10/2017 | Quigley et al. | |
| 2003/0227220 | A1* | 12/2003 | Biskup, Jr. | G05D 23/1905 307/116 |
| 2007/0030122 | A1 | 2/2007 | Rickrode | |
| 2007/0043954 | A1 | 2/2007 | Fox | |
| 2010/0145737 | A1 | 6/2010 | Joao | |
| 2011/0029777 | A1* | 2/2011 | Murakami | G06F 9/4401 713/171 |
| 2012/0066757 | A1 | 3/2012 | Vysogorets et al. | |
| 2012/0237028 | A1* | 9/2012 | Khazan | G05D 1/0022 380/201 |
| 2013/0081101 | A1 | 3/2013 | Baer et al. | |
| 2013/0214901 | A1* | 8/2013 | Pineau | H04W 4/90 340/5.61 |
| 2014/0282929 | A1 | 9/2014 | Tse | |
| 2015/0170448 | A1* | 6/2015 | Robfogel | G07C 9/00904 340/5.61 |
| 2015/0199863 | A1* | 7/2015 | Scoggins | G07C 9/00904 340/5.25 |
| 2015/0221147 | A1 | 8/2015 | Daniel-Wayman et al. | |
| 2015/0253825 | A1* | 9/2015 | Hladky | H02M 3/156 713/340 |
| 2015/0278548 | A1 | 10/2015 | Brands | |
| 2015/0302409 | A1 | 10/2015 | Malek et al. | |
| 2016/0006768 | A1 | 1/2016 | Tse | |
| 2016/0127931 | A1 | 5/2016 | Baxley et al. | |
| 2016/0156604 | A1 | 6/2016 | Oh | |
| 2017/0039790 | A1 | 2/2017 | Roy | |
| 2017/0124792 | A1 | 5/2017 | Schoenfelder et al. | |
| 2017/0195322 | A1 | 7/2017 | Cho et al. | |
| 2017/0228953 | A1* | 8/2017 | Lupovici | G07C 9/00896 |
| 2017/0236193 | A1 | 8/2017 | Zundel et al. | |
| 2017/0270728 | A1 | 9/2017 | Troesch et al. | |
| 2018/0007041 | A1 | 1/2018 | Davis et al. | |
| 2018/0060989 | A1 | 3/2018 | Hietanen et al. | |
| 2018/0069703 | A1* | 3/2018 | Chakraborty | H04L 9/3231 |
| 2018/0083955 | A1 | 3/2018 | Tuli et al. | |
| 2018/0350170 | A1 | 12/2018 | Wang et al. | |

FOREIGN PATENT DOCUMENTS

| | | |
|---|---|---|
| CN | 104167041 | 11/2014 |
| CN | 105052108 | 11/2015 |
| CN | 105488887 | 4/2016 |
| CN | 106097492 | 11/2016 |
| CN | 106161384 | 11/2016 |
| CN | 106355708 | 1/2017 |
| CN | 106575454 | 4/2017 |
| JP | 0660100 | 4/1994 |
| JP | 2002183563 | 6/2002 |
| JP | 2006117099 | 5/2006 |
| JP | 2006172357 | 6/2006 |
| JP | 2007079910 | 3/2007 |
| JP | 2013045278 | 3/2013 |
| JP | 2014134881 | 7/2014 |
| JP | 2019505058 | 2/2019 |
| WO | 2018213090 | 11/2018 |

OTHER PUBLICATIONS

U.S. Appl. No. 15/714,956, filed Sep. 25, 2017, Titled: Time-Bound Secure Access.
PCT/US2019/020300, "International Search Report and Written Opinion", dated May 21, 2019, 17 pages.
CN201811114947.X, "Office Action", dated Feb. 3, 2020, 10 pages.
JP2018-178739, "Notice of Decision to Grant", dated Feb. 25, 2020, 6 pages.
CN201880032053.8, "Office Action", dated May 21, 2020, 17 pages.
GB1815400.5, "First Examination Report", dated Apr. 28, 2020, 1 page.
JP2019-562575, "Office Action", dated Apr. 14, 2020, 4 pages.
Application No. JP2019-562575, Notice of Decision to Grant, dated Aug. 3, 2020, 6 pages.

* cited by examiner

INTEGRATED ACCESS CONTROL SYSTEM

BACKGROUND

As used herein, "physical access control" refers to the practice of restricting access or entrance to a secure area or physical resource to authorized persons. There are a number of access control systems available to restrict access to secure areas and/or resources. Access to some of these secure areas and/or resources may be gained by presenting an access device appropriate to each access control system. For example, access may be restricted to users with a correct, physical key that opens a physical lock. In some buildings, access may be enabled through the use of an access card that a user can swipe at an access control unit that is affixed to a building. However, limited options are available for users to access the building without a physical key or entry card.

Recent developments have permitted users to access locations based on sharing data, like PINs (personal identification numbers). For example, the user may be granted access to the location by receiving a PIN from a source that has knowledge of the correct PIN. The user may type the PIN into a keypad of the access control reader affixed to the building. However, receiving this PIN can compromise access control when the building is located in a densely populated area or the access control unit is located underground in an area without network access. For example, it may be that the user must receive the PIN prior to arriving at the building, because the user is unable to receive network communications that include the PIN. In some examples, the user may be forced to use less secure methods of maintaining the PIN for the particular building prior to arriving at the access control unit for the building, like writing the PIN on a piece of paper, which can lead to unauthorized access.

Thus, improved methods of granting access to a location and maintaining security of the access methods is needed. Embodiments of the invention address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
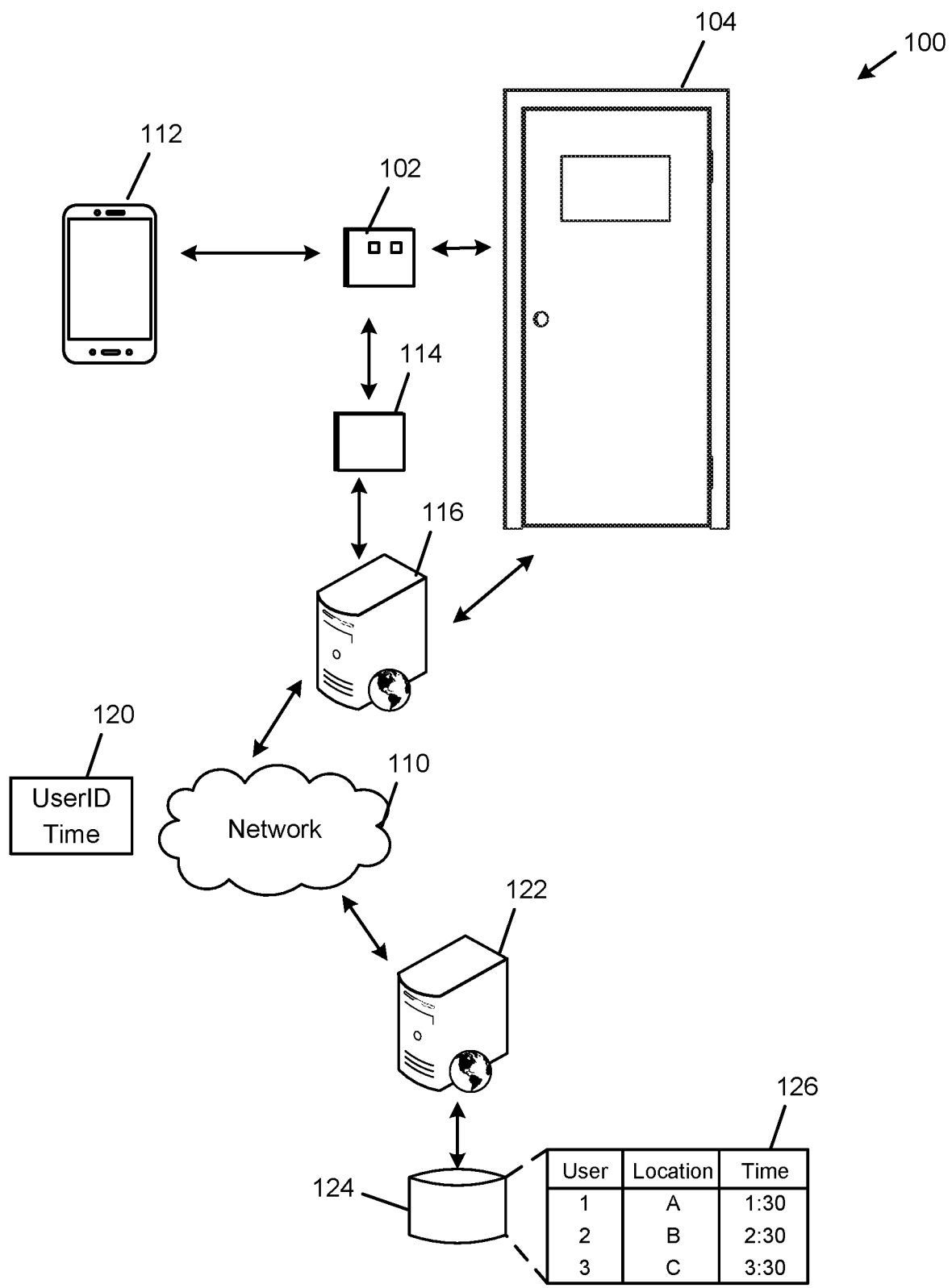
FIG. 1 illustrates a sample system configured to provide access to a location, according to an embodiment of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, systems and methods for controlling access to a physical location, e.g., by a person and/or vehicle. A user device may provide user credentials to an input device of an access system. The input device may transmit the user credentials to a splitter, in some examples, and then to an access control board. In other examples, the input device may transmit the user credentials from a splitter to a network-connected gateway and then to the access control board. In either example, the power and signal wires may be reused for the splitter and/or network-connected gateway, at least in part to increase efficiency in installation of the splitter and/or network-connected gateway with the access control system. The access control board may be coupled with an electrically-controlled device (e.g., garage door, electronic door lock, latch relay, etc.) and configured to allow access to the physical location with one or more electronic signals to the electrically-controlled device. The electrically-controlled device may allow access when the user credentials are authenticated by the system.

In a sample illustration, a user may swipe or tap a portable user device, including a user mobile device, at the input device affixed with a side and/or an exterior surface of a secure, physical location. The input device may electronically pass the credentials through a splitter that is electronically connected with the input device utilizing a first set of power wires and a first set of signal wires. The power wires may provide an electronic current to the splitter to provide power to the splitter. The signal wires may allow data to pass between the splitter and the input device. A second set of power wires and a second set of signal wires may connect the splitter and the access control board. The access control board may receive the credentials and verify access in accordance with the credentials received from the input device and/or the splitter. The confirmation of authentication may initiate activation by the access control board to permit access to a physical area associated with the access control board and the input device (e.g., unlocking a door, opening a garage door or other physical barrier, etc.).

In another sample illustration, a user may swipe or tap a portable user device, including the user mobile device, at the input device. The input device may electronically pass the credentials through a splitter that is electronically connected with the input device utilizing a first set of power wires and a first set of signal wires. The splitter may also comprise a network-connected gateway of the splitter that receives the user credentials through the signal wires and receives power through the power wires. The network-connected gateway may transmit to the user credential to a network-connected authentication processor to confirm authentication or validation. The access control board may receive the validated credentials and confirm authentication of the portable user device. In some examples, the access control board may verify the user credential and may initiate activation to permit access via an electrically-controlled device. This may permit access of the user to a physical area associated with the access control board and the input device.

Embodiments of the disclosure provide several technical advantages over other systems. For example, the implementation of the splitter may add a common communication protocol to increase ability to electronically communicate with the access control system that utilizes existing power wires and transmits electronic communications using existing signal wires. The cost of installing the splitter may be optimal (e.g., minimal), since electrical wires and signal wires may be reused, which minimize the need to call an electrician to rewire a building or pull permits for heavily regulated wiring standards.

FIG. 1 illustrates a sample system configured to provide access to a location, according to an embodiment of the disclosure. In illustration 100, a user credential input device or an input device 102 (used interchangeably) may be used to control access to an access control point location 104 (e.g., a physical location). A portable user device 112 (e.g., keyfob, radio frequency identifier (RFID), user device, etc.) may be in communication with the input device 102 and/or a network 110. In some examples, portable user device 112 may be configured to receive a wireless communication from a user device and cause the access control system to allow access (e.g., unlock an electronically controlled locking device or other electrically-controlled device) to the access control point location 104.

The access control point location 104 may be any suitable barrier for which access may be controlled. The access control point location 104 may be a physical facility, computer-based information system, door, turnstile, parking gate, elevator, garage door, or other physical barrier, where granting access can be electronically controlled. The access control point location 104 may include an electronic lock. The access control point location 104 may be within electronic communication and electronically controlled by the access control board 116. In some embodiments, an access control point location 104 may also include a sensor to detect when the access control point location 104 has been accessed inappropriately and trigger an alarm.

The input device 102 and/or access control point location 104 may receive power from the access control board 116 in a dedicated power line (e.g., 220 volt power source) and, in some examples, the electrically-controlled device that permits access to the physical location receives power from the access control point location 104 (e.g., a 5 volt or 12 volt power source, or receives electrical power that comprises 12 volts, etc.). The input device 102 and/or access control point location 104 may also receive electronic signals from the access control board 116 in a dedicated signal line (e.g., using an Ethernet network cable standard, etc.).

In some embodiments, input device 102 may be any suitable electronic device capable of receiving a user credential and either granting or denying access to an access control point location 104 based on the received user credential. In some non-limiting examples, an input device 102 could be a keypad into which a code is entered a card reader, a keyfob receiver, a radio frequency identifier (RFID) reader, or a biometric reader.

When the user credential is presented to an input device 102, the input device 102 may send information indicating the credential to a processor device of the access control board 116. The information may pass through one or more secondary devices 114 before the credential is received at the access control board 116, including a splitter and/or a network-connected gateway, as illustrated with at least FIGS. 2-6. The access control board 116 may compare the credential to entries within an access control list, grant or deny the presented request based on that comparison, and send a transaction log to a database.

When the credential is not listed in the access control list, access is denied and the access control point location 104 remains secure and unopened. If there is a match between the user credential and an entry on the access control list, the access control board 116 may operate an electronic relay that grants access to the access control point location 104. In some embodiments, the input device 102 may provide feedback to a user, such as displaying a flashing red light-emitting diode (LED) when access has been denied and a flashing green LED when access has been granted.

In some examples, the access control board 116 may transmit an authentication request 120 to authentication processor 122 via network 110. The authentication request 120 may comprise the user credential and time that the user requested access to the access control point location 104. The authentication processor 122 may compare the user credential and time from the authentication request 120 with a data store 124 comprising an authentication table 126 of permitted user credentials and times. When the user credential matches a user credential from the authentication table 126, as determined by the authentication processor 122, the authentication process 122 may transmit an authentication approval to the access control board 116. An entry may be added to the access control list for the user credential to permit access to the access control point location 104 during the particular time identified from the authentication table 126.

In some examples, an access credential may be incorporated. For example, the user credential is presented to an input device 102, the input device 102 may send information indicating the credential to a processor device of the access control board 116. The information may pass through one or more secondary devices 114 before the credential is received at the access control board 116, including a splitter and/or a network-connected gateway, as illustrated with at least FIGS. 2-6. The user credential may be authenticated and, rather than passing the user credential to access control board 116, the splitter and/or a network-connected gateway may pass an access credential to access control board 116. The access control board 116 may compare the access credential to entries within an access control list and grant or deny access to the physical location based on that comparison.

In some examples, the physical location of the portable user device 112 interacting with the input device 102 may be determined and used for authentication as well. For example, a physical location (e.g., geolocation, latitude/longitude, etc.) of the access point 104 or input device 102 may be determined and stored in a memory of the authentication processor 122. In some examples, the input device 102 may be immovable and the physical location of the input device 102 may remain static. The physical location of the portable user device 112 may be dynamic and may be determined by a location positioning system (e.g., global positioning system (GPS), etc.)). The location of the portable user device 112 may be identified by the location positioning system and transmitted to one or more secondary devices 114 or to authentication processor 122, either transmission using a wireless communication protocol.

In some examples, the limitations of the wireless protocol may limit the communication ability between portable user device 112 and input device 102. For example, when communicating via a short-range wireless communication protocol (e.g., Bluetooth®, etc.), communications may be limited to a particular distance based on the limitations of the wireless network (e.g., within 30 feet, within 200 feet, etc.). When input device 102 receives a communication within the particular distance of the access point 104 or the input device 102 defined by the short range wireless communication protocol, the process of receiving the communication may also help confirm the physical proximity of the portable user device 112.

In some examples, the physical location may be transmitted to the authentication processor 122 via a long-range wireless communication protocol. The authentication processor 122 may compare the physical location of portable user device 112 (transmitted via the wireless network) with the stored location of the access point 104 or input device 102. When the two are within a threshold distance of each other, the portable user device 112 may be verified to be proximate or near a location of the access point 104 or the input device 102 when the access request is received.

In some examples, one or more secondary devices 114 may be routed through or connected with these existing power and signal wires. This may allow the one or more secondary devices 114 to share the dedicated power and data that is provided by the access control board 116.

Portable user device 112 may comprise computer readable media, including a credential, user identifier, personal identification number (PIN) or embody a physical device, including a user device, access badge, or a biometric feature. Portable user device 112 may be configured to relay the credential to an input device 102, including via wireless or wired communication, image recognition (e.g., image scanning technology for a biometric feature), or physical contact with input device 102. In some embodiments, portable user device 112 may be any suitable type of computing device such as, but not limited to, a mobile phone, a smart phone, a smartcard with a magnetic stripe, a personal digital assistant (PDA), a laptop computer, a desktop computer, a server computer, a thin-client device, a tablet PC, etc. Additionally, portable user device 112 may be any type of wearable technology device, such as a watch, earpiece, glasses, etc. Portable user device 112 may include one or more processors capable of processing user input. In some embodiments, the user device 112 may have installed upon it a mobile application (i.e., a set of computer-executable instructions) that enables communication with the input device 102.

A user credential may be any identifier associated with portable user device 112. For example, the user credential may be an account identifier or an identifier of portable user device 112 which is associated with an account. In the event that portable user device 112 is a keyfob, the keyfob may be given a serial number or other identifier by its manufacturer. The keyfob, when communicating with the input device 102, may be configured to provide that identifier to the input device 102. In this example, the keyfob may be assigned to a user's account. The identifier may then act as a user credential to access an area which the user is authorized to access.

In some examples, a user credential may be verified and/or converted from a first format to a second format. For example, the splitter may generate the verified user credential that is included in a first data format that corresponds to the user credential encoded in the second data format. In some examples, the user credential may be a cryptographic certificate rather than a user identifier. The verified user credential may be generated by extracting data from a certificate or from a separate user identifier returned by the network-connected gateway as part of the verification process. The generation process may comprise a hashing algorithm in some examples.

In some examples, an access credential may be implemented in addition to a user credential. The access credential may be a single value that is not associated with portable user device 112 or any other particular user device. The access credential, in these examples, may be associated with input device 102. The access credential may be generated by a manufacturer of input device 102, the administrative manager of access control point location 104 at the physical location, or other source, including access control board 116 or authentication processor 122. The access credential may be changed periodically.

In some examples, the user credential may be transformed from a first data format to a second data format. For example, the user credential may be received in a series of bits that are specific to a standardized security protocol. The user credential may be transformed into a second format for transmission to a device that requires a specific format (e.g., including a header, character or size limit, etc.). In a specific illustration, the first data format may comprise a Wiegand format and the second data format may comprise a format according to a near field communication (NFC), Bluetooth® communication protocol, or other wireless communication protocol for transmitting or receiving data.

Network 110 may include any one or a combination of many different types of networks, such as cable networks, the Internet, wireless networks, cellular networks, and other private and/or public networks. Additionally, network 110 may represent communications transmitted over a landline phone, via a kiosk, or in any other suitable manner.

For clarity, a certain number of components are shown in FIG. 1. In some embodiments, implemented systems may include fewer than or greater than all of the components shown in FIG. 1. In addition, the components in FIG. 1 may communicate via any suitable communication medium, including the Internet or various communication protocols.

Figure 2:
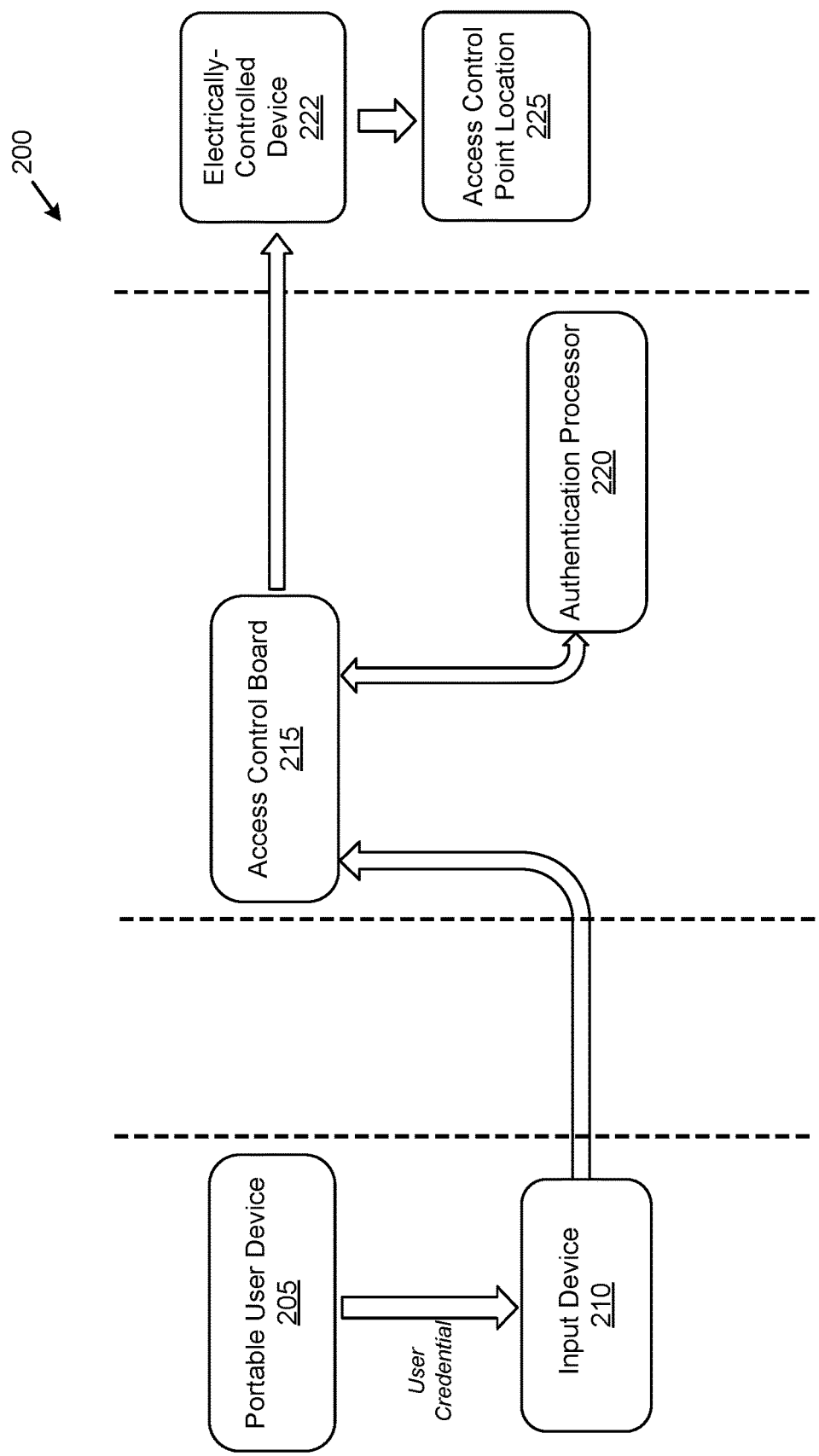
FIG. 2 illustrates an example system for providing access to a secure location.

FIG. 2 illustrates an example system for providing access to a secure location. In some examples, illustration 200 may describe a somewhat conventional system without implementing a splitter device or a network-connected gateway of the splitter.

In illustration 200, the portable user device 205 may comprise a user credential (e.g., user identifier or PIN). The portable user device 205 may electronically communicate with an input device 210 via a wireless communication. In some examples, the portable user device 205 may be physically presented to the input device 210 (e.g., swipe, insert, type a PIN at a keypad, etc.). The input device 210 may the configured to receive the user credential and transmit the user credential over for set of wires in a first data format in accordance with a standard security protocol (e.g., Wiegand protocol, etc.) to an access control board 215.

The standard security protocol may comprise a communication protocol in a data format that is implemented with a user interface (e.g., Wiegand interface, etc.) that comprises one parity bit, eight bits of facility code, sixteen bits of identifier code, and a trailing parity bit for a total of twenty-six bits. In some examples, the standard security protocol may comprise less than thirty-seven bits in length.

The access control board 215 may receive the user credential. In some examples, the access control board 215 may be located in a different part of the building as the input device 210. This may include a secure room that is inaccessible to outsiders. The access control board 215 may comprise a network connection and communication access to an authentication processor 220.

The access control board 215 may compare the received user credential with a list of approved user credentials stored with a memory of the access control board 215. In some examples, the access control board 215 may transmit the user credential to authentication processor 220 for confirmation of authentication rather than confirming authentication locally. The user credential may be transmitted to the authentication processor 220 via a second network.

When authentication is granted by either the access control board 215 or the authentication processor 220, the access control board 215 may be configured to at least control the electrically-controlled device 222 coupled with the access control point location 225 with one or more electronic signals. When authenticated, for example, the access control point location 225 may permit access by the user operating the portable user device 205. In some examples, the access control point location 225 may be unlocked by activating a door latch relay by the access control board 215.

Figure 3:
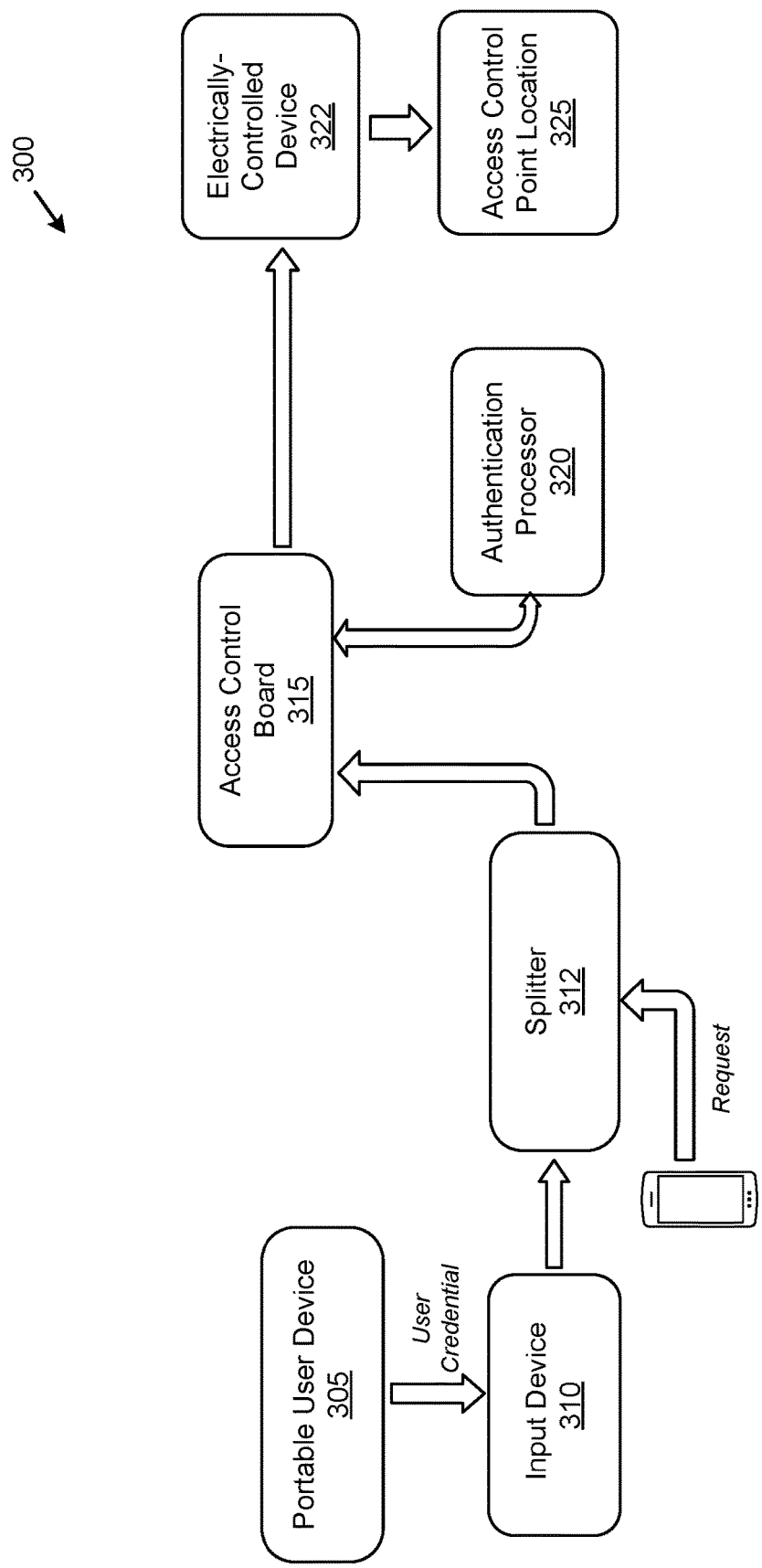
FIG. 3 illustrates an example system for an improved access to a secure location, according to an embodiment of the disclosure.

FIG. 3 illustrates an example embodiment for an improved access to a secure location, according to an embodiment of the disclosure. In illustration 300, a splitter 312 is implemented between the input device 310 and the access control board 315. In some examples, splitter 312 may be implemented to incorporate a Wiegand interface implemented with input device 310 to receive the user credential and provide that user credential, via the existing electrical and signal wiring with the Wiegand interface, to access control board 315. The splitter may inject an additional access request on the existing electrical and signal wiring to access control board 315.

For example, a user may operate a portable user device 305 to access a tool (illustrated with FIG. 10) executed by an application at the portable user device 305 that transmits a user credential via a wireless signal. The splitter 312 may receive wireless signal at a wireless receiver communicatively coupled with the splitter 312 that comprises the user credential from the portable user device 305. In some examples, the wireless signal may comprise a user credential and a request for access to a physical location. The wireless signal may be transmitted via a wireless communication network, utilizing various communication protocols including a near field communication (NFC) protocol and/or short-range wireless communication protocol (e.g., Bluetooth® series of wireless communication standards). The portable user device 305 may detect the splitter 312 through a discovery process enabled by the communication protocol.

At the portable user device 305, the user credential may be encoded in a first data format. When the user credential is received via a wireless signal at the wireless receiver communicatively coupled with the splitter 312, the user credential may be encoded in the second data format distinct from the first data format. The splitter 312 may transform the user credential from the second data format back to the first data format and transmit the transformed user credential to the access control board 315 with a second set of signal wires.

In some examples, an access credential may be incorporated. For example, the user credential may be received by splitter 312 and may be authenticated. Rather than passing the user credential to access control board 315, the splitter may pass an access credential to access control board 315. The access control board 315 may compare the access credential to entries within an access control list and grant or deny access to the physical location based on that comparison.

Once received at splitter 312, the electrical connection between the splitter 312 and the input device 310 may utilize a first set of power wires (e.g., to receive/transmit electrical power between the devices). The electrical connection between the splitter 312 and the access control board 315 may utilize a second set of power wires (e.g., to receive/transmit electrical power between the devices). The splitter 312 may be configured to transmit electrical power between the first set of power wires of wires in the second set of power wires. In some examples, the power wires may also comprise a ground.

The electrical connection between the splitter 312 and the input device 310 may also be communicatively connected with the input device 310 utilizing a first set of signal wires (e.g., to receive/transmit data signals between the devices). The connection between the splitter 312 and the access control board 315 may also utilize a second set of signal wires (e.g., to receive/transmit data signals between the devices). The splitter 312 may be configured to transmit the electric communication signals between the first set of signal wires in the second set of signal wires. In some examples, the signal wires may comprise DATA1 as a reader output that delivers pulses that are interpreted as binary ones and DATA0 as a reader output that delivers pulses that are interpreted as binary zeros.

Other embodiments of electrical power sources and data sources are available as well.

For example, splitter 312 may receive a bypass of electrical power from a secondary source (e.g., a power outlet) or an AC/DC adapter that can provide power outputs. In another example, a D0, D1 signal wires may be received from access control board 315 in addition to a ground. Splitter 312 may then receive the electrical power (e.g., VCC) from the secondary source.

Other portions of illustration 300 may be similar to illustration 200. For example, the portable user device 305 may be associated with a user credential. The portable user device 305 may electronically communicate with an input device 310 via a wireless communication. In some examples, the portable user device 305 may be physically presented to the input device 310 and the input device 310 may transmit the user credential to the splitter 312 rather than directly to the access control board 315, according to illustration 300. The splitter 312 may then transmit the user credential to the access control board 315.

The access control board 315 may compare the received user credential with a list of approved user credentials stored with a memory of the access control board 315. In some examples, the access control board 315 may transmit the user credential to an authentication processor 320 for confirmation of authentication rather than confirming authentication locally. The user credential may be transmitted to the authentication processor 320 via a second network (e.g., Internet, etc.). When authentication is granted by either the access control board 315 or the authentication processor 320, the access control board 315 may be configured to transmit a request to the electrically-controlled device 322 coupled with the access control point location 325 via one or more electronic signals. When authenticated, for example, the access control point location 325 may be unlocked for access by the user operating the portable user device 305, according to the request from the access control board 315. In other examples, the door other physical barrier may be moved via an electronic signal to open the door.

Figure 4:
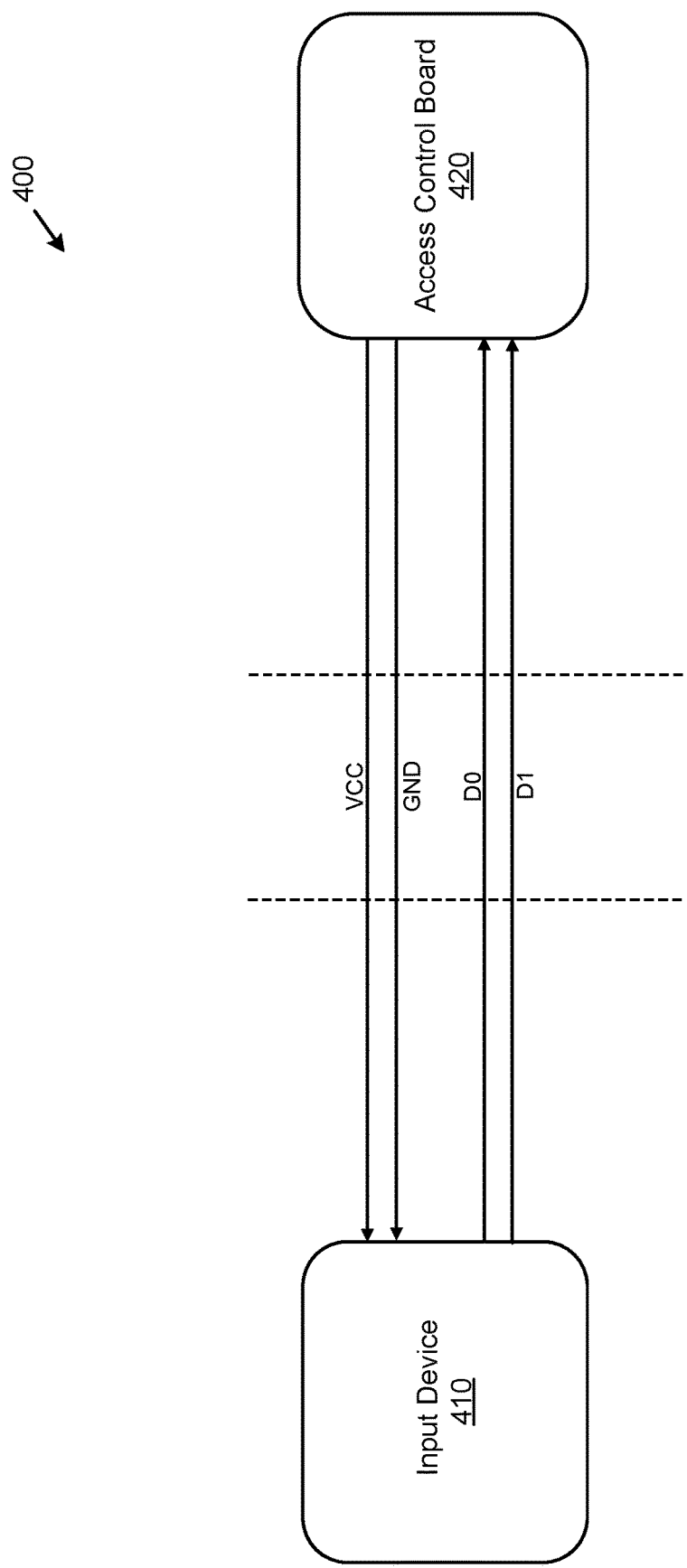
FIG. 4 illustrates an example system for providing access to a secure location.

FIG. 4 illustrates an example system for providing access to a secure location. In some examples, illustration 400 may describe a somewhat conventional system without implementing a splitter device or a network-connected gateway of the splitter.

In illustration 400, an input device 410 and an access control board 420 are shown. The input device 410 may be configured to receive one or more electronic signals from the access control board 420. The electronic signals may comprise a pair of DC (direct current) electrical wires ($V_{CC}$ and ground) that may be used for providing electrical power to input device 410. In some examples, the input device 410 may be located at an access control point without other available AC (alternating current) power sockets.

The input device 410 may also be communicatively coupled with the access control board 420 through a set of signal wires. The signal wires may transmit data using a standardized communication protocol, including for example, Wiegand data lines (D0, D1). For example, the signal wires may be used to transmit a user credential from input device 410 to access control board 420, which decides whether to grant access or not based on the received credential. In total, there may be four wires between the input device 410 and the access control board 420, including a pair of signal wires for data and a pair of electrical wires for power.

In illustration 400, the method of receiving the user credential may be limited. For example, input device 410 may be limited to receiving the user credential via a keyfob or radio frequency identifier (RFID). This may limit the access to the secure location to individuals who physically possess these devices, as described herein.

Figure 5:
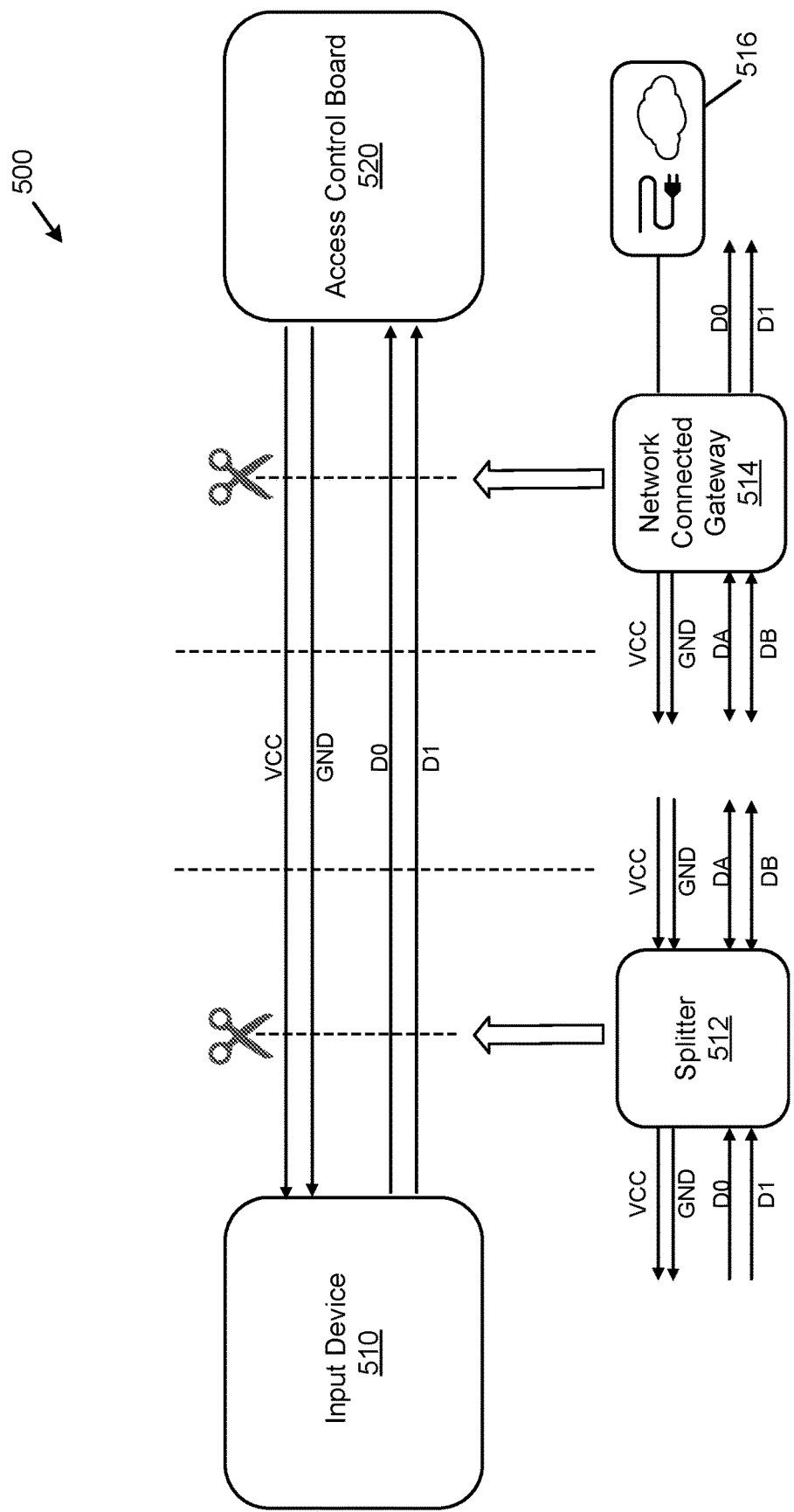
FIG. 5 illustrates another example system for improved access to a secure location, according to an embodiment of the disclosure.

FIG. 5 illustrates another example system for improved access to a secure location, according to an embodiment of the disclosure. In illustration 500, splitter 512 and gateway 514 are implemented between input device 510 and access control board 520. Input device 510 and access control board 520 may be similar to input device 410 and access control board 420, respectively, described in FIG. 4.

In some examples, a user device may have installed upon it a mobile application (i.e., a set of computer-executable instructions) that enables communication with input device 510. The mobile application may comprise a tool to request access to a secure, physical location associated with input device 510 and access control board 520.

The electrical connection between splitter 512 and input device 510 may utilize a first set of power wires. The electrical connection between splitter 512 and gateway 514 may utilize a second set of power wires. The electrical connection between gateway 514 and access control board 520 may utilize a third set of power wires. Splitter 512 may be configured to transmit electrical power between the first set of power wires to the second set of power wires and gateway 514 may be configured to transmit electrical power between the second set of power wires to the third set of power wires. In some examples, the power wires may also comprise a ground.

The electrical signals may originate with an independent power source 516 that is independent of the electrical power connection with the access control board 520. In some examples, the independent power source 516 may provide at least five times the amount of power as the electrical power connection with the access control board 520. For example, the independent power source 516 may be coupled with an AC to DC converter. The converter may be plugged into a wall outlet to convert the AC power from the wall outlet to DC power, which in turn provides electrical power to the gateway 514 and splitter 512.

In some examples, the third set of power wires may not be implemented between gateway 514 and access control board 520 and, in some examples, gateway 514 may receive the electrical power from the independent power source 516. In this instance, the gateway 514 may be communicatively connected with the splitter 512 via a set of signal wires and a set of power wires, but the gateway 514 may be communicatively connected with the access control board 520 via a set of signal wires only and not a set of power wires.

Splitter 512 and input device 510 may also be connected utilizing a first set of signal wires. The electrical connection between the splitter 512 and the gateway 514 may utilize a second set of signal wires. The electrical connection between the splitter 512 and the access control board 520 may utilize a third set of signal wires. The splitter 512 may be configured to transmit electronic signals between the first set of signal wires to the second set of signal wires and the gateway 514 may be configured to transmit electronic signals between the second set of power signal to the third set of signal wires. In some examples, the signal wires may comprise a DATA1 as a reader output that delivers pulses that are interpreted as binary ones and DATA0 as a reader output that delivers pulses that are interpreted as binary zeros.

The splitter 512 may receive a wireless signal at a wireless receiver communicatively coupled with the splitter 512 that comprises the user credential and/or request for access from a portable user device. In some examples, splitter 512 may intercept the communication comprising the user credential. The communication may be sent via the wireless communication protocol and received or intercepted by the wireless receiver communicatively coupled with the splitter 512. The wireless signal may be transmitted via a short-range wireless communication protocol (e.g., Bluetooth® series of wireless communication standards). The portable user device may detect the splitter 512 through a discovery process enabled by the communication protocol.

The splitter 512 may transmit the user credential and/or request for access to the gateway 514 via the third set of signal wires to the access control board 520. In some examples, the gateway 514 may transmit the user credential and/or request to an authentication processor for authentication (as described herein). The authentication processor may confirm or deny authentication and transmit the response back to the gateway 514. The gateway 514 may transmit the wireless signal to the authentication processor via a network connection (e.g., Internet) that may be independent of the signal wires between the input device 510, splitter 512, and access control board 520. The gateway 514, in some examples, may be located physically adjacent to the access control board 520.

In some examples, when the verification of the user credential is successful, the splitter 512 or gateway 514 may pass an access credential to access control board 520 with a second set of signal wires. When access control board 520 receives the correct access credential, access control board 520 may confirm authentication and permit access (e.g., by transmitting a request to allow access to the physical location associated with the input device, etc.). The access credential, for example, may comprise a single value that is not associated with any particular user device. The access credential may be generated by the administrative manager of access control point location 104 at the physical location, or other source, including access control board 520 or an authentication processor. The access credential may be changed periodically.

Splitter 512 and gateway 514 may transmit electronic signals via RS422 or RS485 standards. In some examples, the format of the electronic signals may correspond with a custom communication protocol that can be used for communication between splitter 512 and gateway 514.

In some examples, the system may work in parallel with the existing access control systems. For example, user credentials that are authorized via RFID cards or clickers may still get access, since the described embodiments of the access control system may directly pass the Wiegand access code from the input device (e.g., access control reader) to the access control board.

Figure 6:
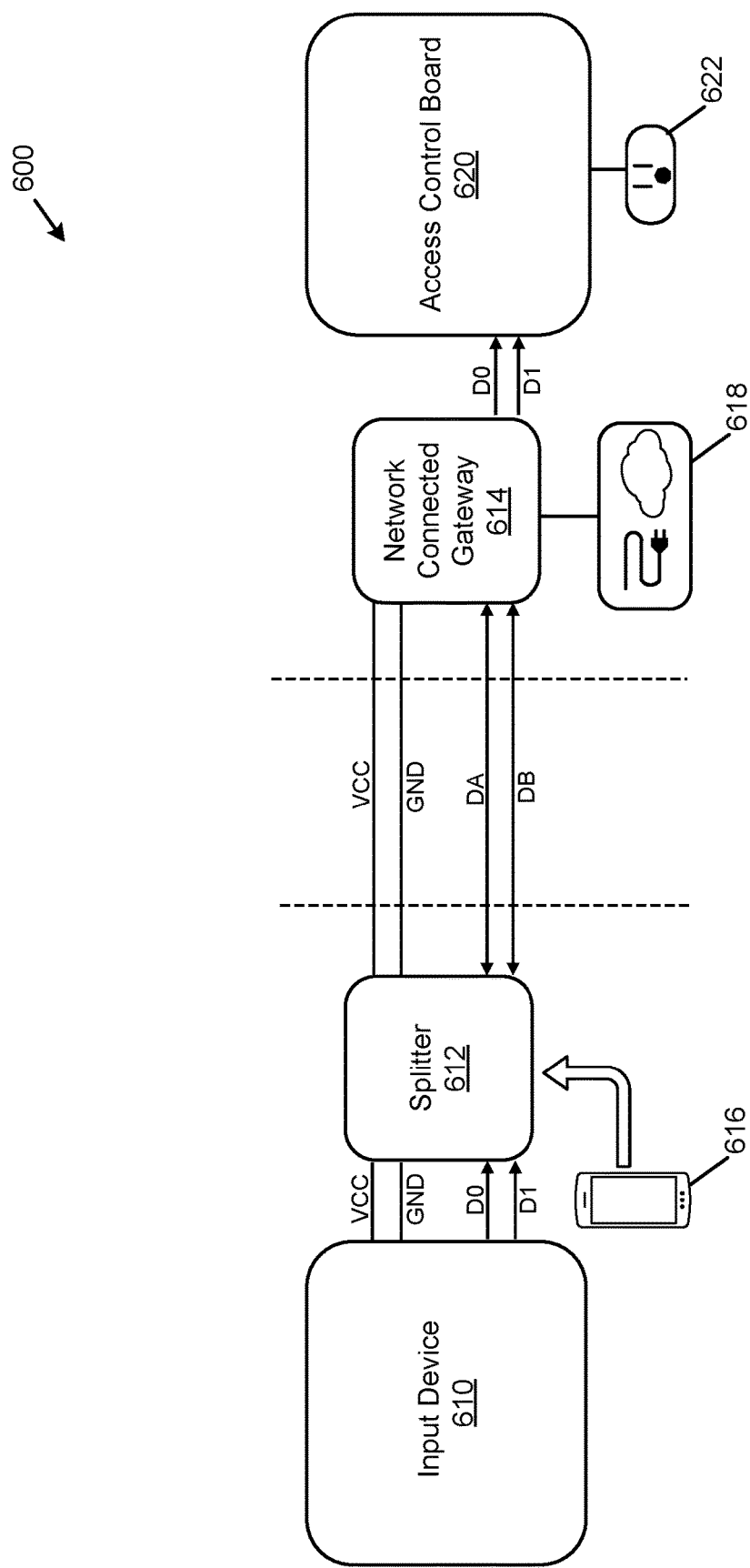
FIG. 6 illustrates yet another example system for improved access to a secure location, according to an embodiment of the disclosure.

FIG. 6 illustrates yet another example system for improved access to a secure location, according to an embodiment of the disclosure. In illustration 600, splitter 612 and gateway 614 are implemented between input device 610 and access control board 620. In some embodiments, splitter 612 and gateway 614 are implemented as a single device, where the network-connected gateway 614 is embodied within splitter 612.

The portable user device 616 may electronically communicate with splitter 612 via a wireless communication. In some examples, portable user device 616 may be physically presented to the splitter 612 to electronically transmit a user credential and/or request for access to a physical location to the splitter 612. The splitter 612 may transmit the user credential to the gateway 614 via a set of signal wires. The gateway 614 may transmit the user credential to the access control board 620.

The gateway 614 may implement an independent network connection (e.g., Internet) that may be independent of the signal wires between the input device 610, splitter 612, and access control board 620. The gateway 614 may comprise an independent power and signal source 618. In some examples, access control board 620 may be physically plugged into an independent power source 622. The gateway 614, in some examples, may be located physically adjacent to the access control board 620.

The access control board 620 may compare the received user credential with a list of approved user credentials stored with a memory of the access control board 620. In some examples, the access control board 620 may transmit the user credential to an authentication processor for confirmation of authentication rather than confirming authentication locally. The user credential may be transmitted to the authentication processor via a second network. When authentication is granted by either the access control board 620 or the authentication processor, the access control board 620 may be configured to at least control the electrically-controlled device coupled with the access control point location with one or more electronic signals. When authenticated, for example, the access control point location may permit access by the user operating the portable user device.

Figure 7:
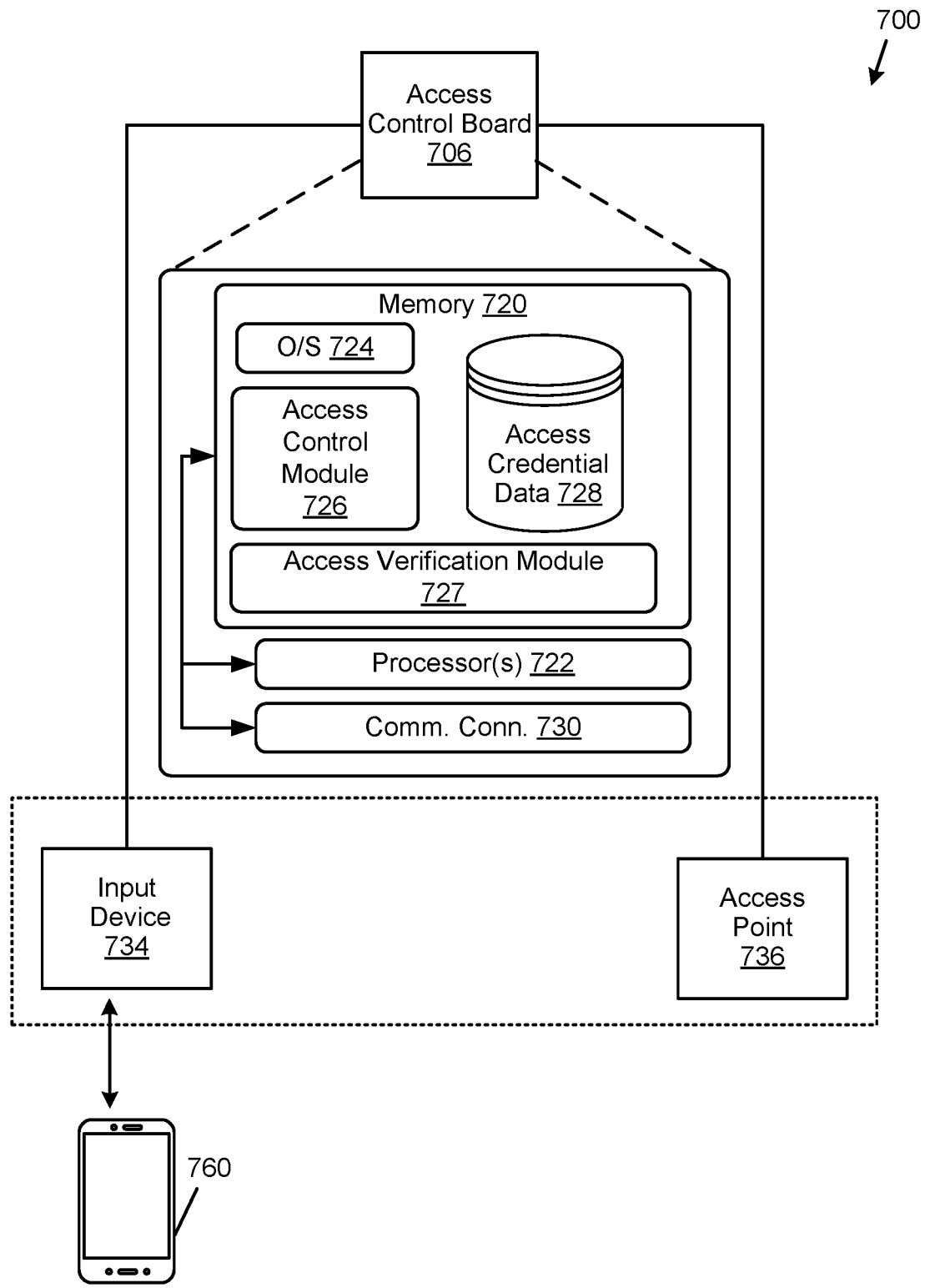
FIG. 7 illustrates an example access control system comprising an access control board and input device, according to an embodiment of the disclosure.

FIG. 7 illustrates an example access control system comprising an access control board and input device, according to an embodiment of the disclosure. In illustration 700, an access control board 706, input device 734, and access point 736 are provided. In some examples, access control board 706 may be installed at a building for access to access point 736. The access control unit may communicate with an authentication processor, as illustrated and FIG. 8. Various embodiments of the access control board 706 are also available, including access control systems that are known in the art.

In some embodiments, the access control board 706 may be a computing device configured to receive information (e.g., user credential, etc.) from input device 734, and determine whether access should be granted to access point 736 based at least in part on an analysis of the user credential.

In some embodiments, at least a portion of functionality described in relation to the access control board 706 may be executed remotely at the remote computing device. For example, some of the functionality described may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the access control board 706 may include at least one memory 720 and one or more processing units (or processors) 722. The processors 722 may be implemented as appropriate in hardware, computer-executable instructions, firmware or combinations thereof. Computer-executable instruction or firmware implementations of the processors 722 may include computer-executable or machine executable instructions written in any suitable programming language to perform the various functions described.

The memory 720 may store program instructions that are loadable and executable on the processors 722, as well as data generated during the execution of these programs. Depending on the configuration and type of access control board 706, the memory 720 may be volatile (such as random access memory (RAM)) and/or non-volatile (such as read-only memory (ROM), flash memory, etc.). The access control board 706 may also include additional storage, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 720 may include multiple different types of memory, such as static random access memory (SRAM), dynamic random access memory (DRAM) or ROM. Turning to the contents of the memory 720 in more detail, the memory 720 may include an operating system 724 and one or more application programs or services for implementing the features disclosed herein including at least a module for causing an access control point to permit access (access control module 726). The memory 720 may also include access credential data 728, which contains one or more user credentials that can be used to gain access to access point 736. In some embodiments, the access credential data 728 may be stored in a database.

The memory 720 may be either removable and non-removable memory and may include non-transitory, computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device or the access control board 706. The access control board 706 may also contain communications connection(s) 730 that allow the access control board 706 to communicate with a stored database, another computing device or server, user terminals, and/or other devices (e.g., the user device and/or the access control system). For example, the communication connections 730 may include a wireless receiver (e.g., a Bluetooth® receiver).

Turning to the contents of the memory 720 in more detail, the memory 720 may include an operating system 724, a database containing access credential data 728, and one or more application programs or services for implementing the features disclosed herein, including an access control module 726 and access verification module 727.

In some embodiments, the access control module 726 may be configured to record a user credential at access credential data store 728. For example, when the input device 734 receives a user credential from the portable user device, the access control module 726 may receive the user credential and record it to the access credential data store 728. The access control board 706 may permit access to the user credentials that match an user credential that is stored with the access credential data store 728.

In some embodiments, the access verification module 727 may be configured to confirm a time associated with the request to access a physical location associated with the access point 736 for a particular user credential. The access verification module 727 may compare a current time with an approved time from an access request of the user device. When the current time is within a time range for access, as identified in the access credential data store 728, the user credential may be granted access to the access point 736.

The input device 734 may be an example of input device 102 depicted in FIG. 1. Upon receiving a user credential, the input device 734 may relay the user credential to the access control board 706. The access control board 706 may compare the access credential to entries on a control list. Upon determining that the user credential is valid (e.g., matches an entry in the control list, valid between a particular time range, etc.), the access control board 706 may grant access to access point 736 (e.g., activate an electronic door relay to cause an electronic lock to open, or electrically move a physical barrier to permit access to a physical location).

Figure 8:
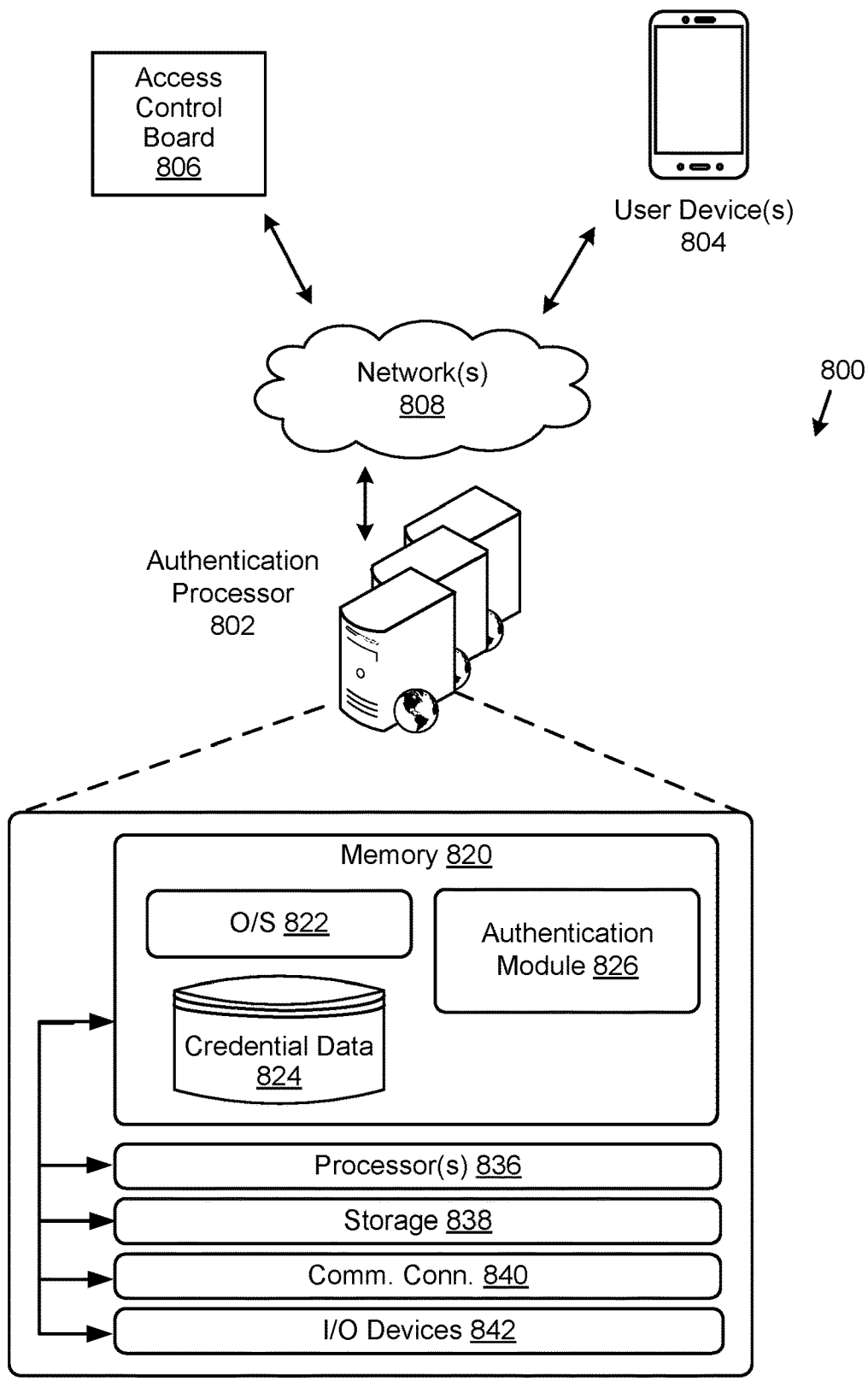
FIG. 8 illustrates an example authentication computer system, according to an embodiment of the disclosure.

FIG. 8 illustrates an example authentication computer system, according to an embodiment of the disclosure. In illustration 800, an authentication processor 802 may be in communication with an access control board 806 and one or more user devices 804 via a network 808. The network 808 may include any one or a combination of many different types of networks, such as cable networks, the Internet, wireless networks, cellular networks, and other private and/or public networks.

The authentication processor 802 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the authentication processor 802 may be executed by one more virtual machines implemented in a hosted computing environment. The hosted computing environment (e.g., a cloud computing environment) may include one or more rapidly provisioned and released computing resources, which computing resources may include computing, networking, and/or storage devices.

In one illustrative configuration, the authentication processor 802 may include at least one memory 820 and one or more processing units (or processors) 836. The processors 836 may be implemented as appropriate in hardware, computer-executable instructions, firmware or combinations thereof. Computer-executable instruction or firmware implementations of the processors 836 may include computer-executable or machine executable instructions written in any suitable programming language to perform the various functions described.

The memory 820 may store program instructions that are loadable and executable on the processors 836, as well as data generated during the execution of these programs. Depending on the configuration and type of authentication processor 802, the memory 820 may be volatile (such as random access memory (RAM)) and/or non-volatile (such as read-only memory (ROM), flash memory, etc.). The authentication processor 802 may also include additional storage 838, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 820 may include multiple different types of memory, such as static random access memory (SRAM), dynamic random access memory (DRAM) or ROM.

The authentication processor 802 may also contain communications connection(s) 840 that allow the authentication processor 802 to communicate with a stored database, another computing device or server, user terminals, and/or other devices on the network(s) 808. The authentication processor 802 may also include input/output (I/O) device(s) and/or ports 842, such as for enabling connection with a keyboard, a mouse, a pen, a voice input device, a touch input device, a display, speakers, a printer, etc.

Turning to the contents of the memory 820 in more detail, the memory 820 may include an operating system 822 and one or more application programs or services for implementing the features disclosed herein including at least an authentication module 826.

The authentication module 826 may receive a user credential with a request to access a physical location. The user credential may comprise any suitable string of characters used to map a request to permissions associated with the request. The request may be associated with an expiration date that may be a numeric value (e.g. a 4-digit numeric value). In some embodiments, the request can comprise a time of issuance. Access may be allowed to the physical location starting at one timestamp and ending at another. If desired, the access can begin at a current time corresponding with when the access is requested by the user device. Access may be valid after a start time and before an end time, or within a time range and associated with a particular time zone of the physical location. The authentication module 826 may determine whether the time corresponding with receiving the user credential from the user device is within the start time and the end time, by determining a current time and comparing the current time with the time corresponding with receiving the credential. When the time that the credential is received is within the time range of permissible access, then the authentication module 826 may determine that the credential is valid in at least one aspect.

The authentication module 826 may also be configured to compare the user credential to the user credentials stored in the credential data store 824 to determine the authentication of the user device. Upon determining that the user credential is valid, the authentication module 826 may be configured to provide instructions to the access control board 806 to grant access to the user of the user device 804.

In some examples, the modules and functionality of the authentication processor 802 may be stored with the memory of the access control board 806. For example, the access control board 806 may comprise an authentication module 826 to compare the generated credential with a received credential from the user device 804. This may enable access to the secure location when network connectivity between the access control board 806 and the authentication processor 802 is inconsistent or lost.

Figure 9:
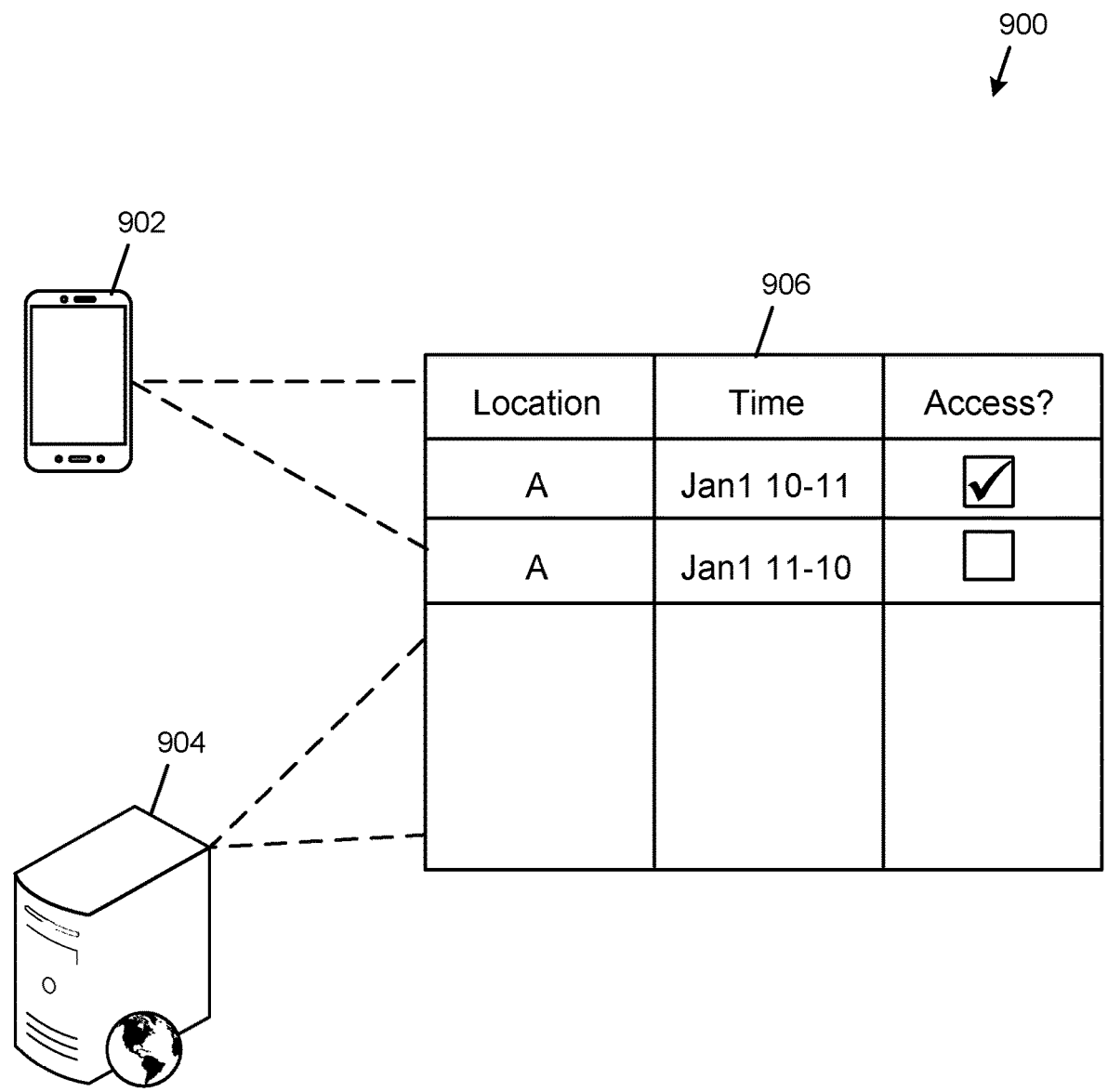
FIG. 9 illustrates an example time-based access user interface, according to an embodiment of the disclosure.

FIG. 9 illustrates an example time-based access user interface, according to an embodiment of the disclosure. In illustration 900, a user interface for transmitting a request for access to a physical location is provided. The authentication server 904 may provide a user interface 906 that is accessed by a user device 902 to request to obtain access to the secure location prior to the time that the user device 902 is at the physical location. For example, a user device 902 can interact with a network page 906 that identifies a plurality of locations, time options, time ranges (e.g., start time, end time, etc.), and tools to request access to the corresponding locations. In some examples, the user device 902 may interact with the user interface 906 to select a start time and an end time that the user device 902 plans to access the location. The user interface 906 may display the location and time range that the user device 902 is permitted to access at the user interface.

In some examples, the request from user device 902 to access the physical location may be conducted prior to user device 902 arriving at the physical location and a second location check may be conducted while user device 902 is at the physical location. For example, user device 902 to request to obtain access to the secure location prior to the time that user device 902 is at the physical location (e.g., using user interface 906). User device 902 may receive a user credential (e.g., via a network connection, etc.) once user device 902 is authenticated. When user device 902 arrives at the physical location, the user credential may be transmitted to an input device at the physical location to gain access to a secured area of the physical location.

In some examples, the location of user device 902 near the input device at the physical location may be determined and used for authentication as well. For example, after user device 902 receives the user credential, user device 902 may move within a proximate distance of the physical location of the input device (e.g., determined by a location positioning system, etc.) to submit the user credential to the input device. The submission of the user credential may trigger a second authentication check for the physical location of user device 902. For example, the physical location of the input device may be determined and compared with the physical location of user device 902 by transmitting the physical location of user device 902 via a short-range communication network to the input device. The user device 902 may be further authenticated (in addition to the authentication via user interface 906) when user device 902 is within a threshold distance of the input device at the time that user device 902 submits the user credential to request access to the physical location.

Figure 10:
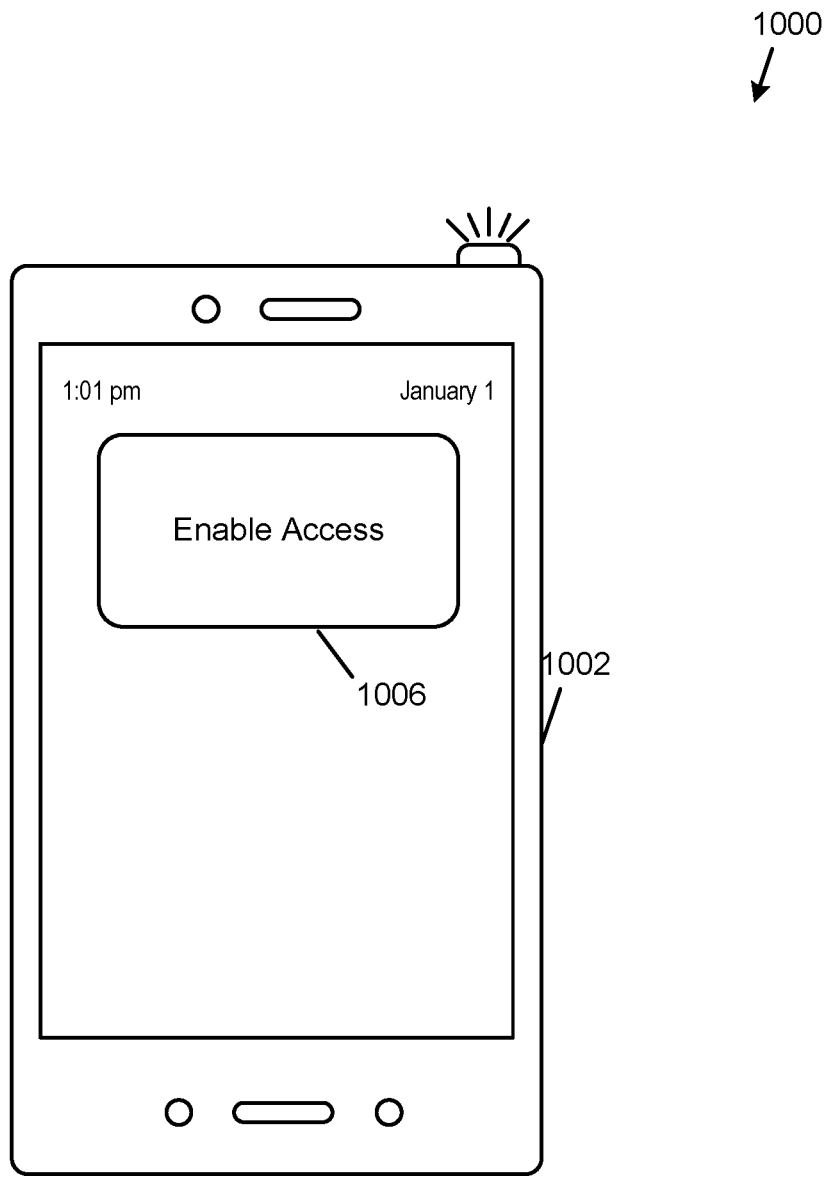
FIG. 10 illustrates an example authentication request user interface, according to an embodiment of the disclosure.

FIG. 10 illustrates an example authentication request user interface, according to an embodiment of the disclosure. In illustration 1000, the user device 1002 may include one or more processors capable of processing user input via the user interface or antenna. The user device may also include one or more input sensors (e.g., accelerometers, cameras, microphones, etc.) for receiving user input and/or conditions associated with the user device. The user input obtained by the input sensors may be from a variety of data input types, including, but not limited to, audio data, visual data, or biometric data.

A browser application may be provided at the user interface of the user device. The browser application may enable access to a network document to request access to a building, a parking spot, or other restricted access area by accessing an authentication process via a network.

The browser application may allow the users to interact with one or more remote servers, such as to store, access, and/or manage data, develop and/or deploy computer applications, and/or interact with web content. In some embodiments, at least some of the one or more remote servers, perhaps arranged in a cluster of servers or as a server farm, may be configured provide access credentials to user device via the browser application or via the access control application.

In some embodiments, browser application may be hosted at a server. For example, user device may be a thin client device capable of accessing a browser application remotely. The browser application may be capable of handling requests from many users and serving, in response, various user interfaces that can be rendered at user device such as, but not limited to, a web site. The browser application may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application, such as with other applications running on the user device.

The memory of the user device may also include an access control application that is capable of communicating a user credential and a request to access a physical location to an input device of the access control system. The input device may be in communication with an access control board or authentication processor to determine whether to permit access to the user device at the physical location.

The user device 1002 may comprise a module or software application for enabling access to the location. The user device 1002 may access the module when the user device is within a proximate distance of an access control point location at a physical location. The user may activate a tool 1006 via user interface of the user device 1002 to initiate an authentication process and gain access to the location. Upon activation of the tool 1006, the user device 1002 may access the user credential to provide to the input device at the physical location.

Figure 11:
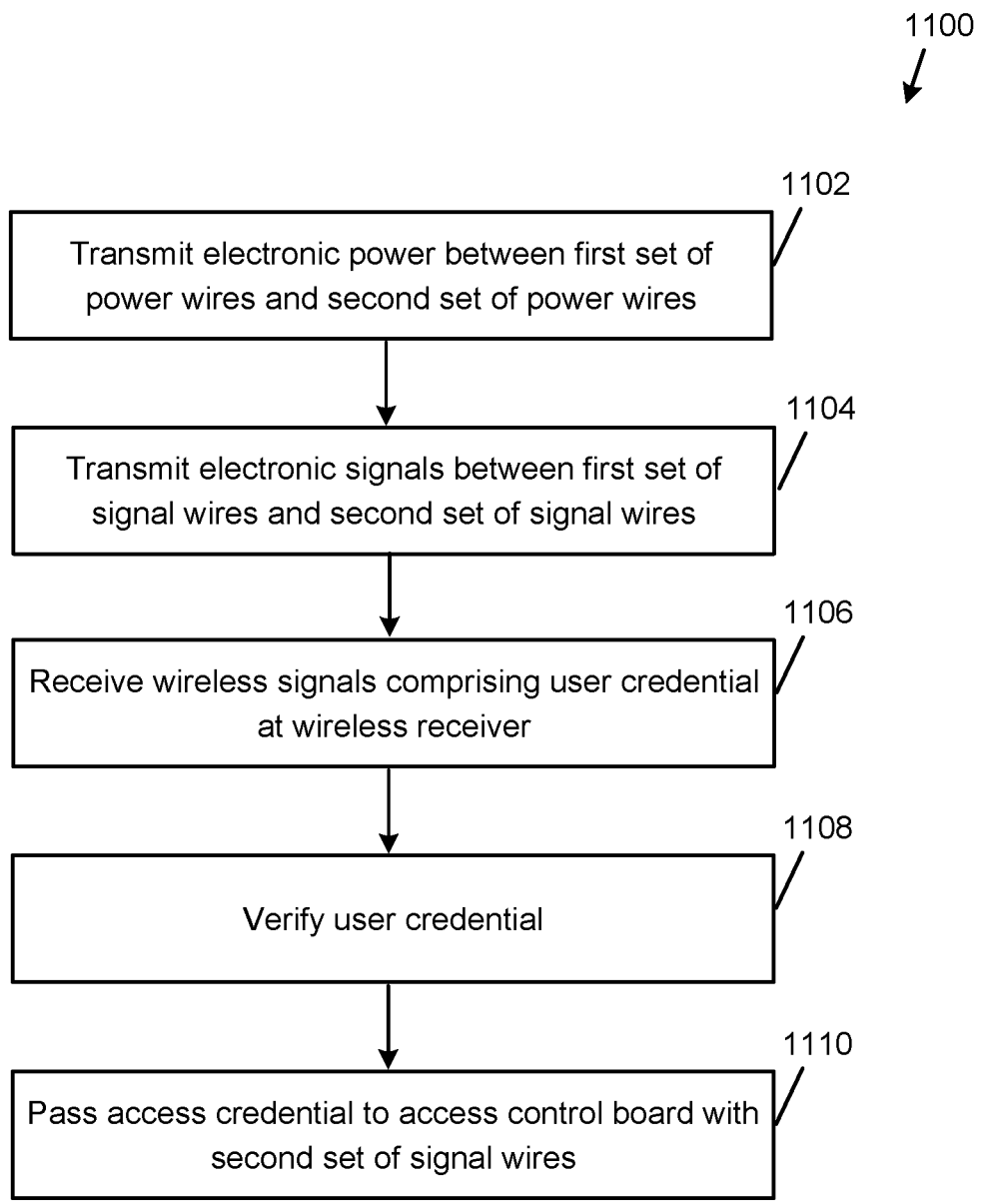
FIG. 11 illustrates an example flow diagram for granting access to location, according to an embodiment of the disclosure.

FIG. 11 illustrates an example flow diagram for granting access to location, according to an embodiment of the disclosure. The process 1100 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 1100 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 1100 of FIG. 11 may be performed by at least the one or more of the computing devices illustrated herein, including a splitter. The splitter may perform the physical actions of the process at a physical layer of the device (e.g., via electrical or signal wires), data link layer, transport layer, or application layer of the device. When performing actions at the application layer, the code may be stored on a computer-readable storage medium, for example, in the form of a computer program including a plurality of instructions executable by one or more processors. The computer-readable storage medium may be non-transitory.

Process 1100 may be performed by the splitter that is electronically connected with an access control system. The access control system may comprise various devices including the splitter, electrically-controlled device, access control board, and a user credential input device. An illustrative electrically-controlled device may be illustrated in FIG. 2 as electrically-controlled device 222 or FIG. 3 as electrically-controlled device 322. An illustrative user credential input device may be illustrated in FIG. 2 as input device 210 or FIG. 3 as input device 310.

The electrically-controlled device may be configured to, at least in part, control access to physical location. For example, as described throughout the disclosure, the electrically-controlled device may correspond with a door, a gate, or other physical method of securing access to a physical location and may be physically moved, in some examples, in response to an electronic signal.

The access control system may also comprise an access control board. The access control board may be electronically coupled with the electrically-controlled device. The access control board may be configured to, at least, control the electrically-controlled device with one or more electronic signals. This may include activating a door latch relay, activating an electric motor or electric operator to move a physical barrier, or transmitting a request to unlock or lock the locking device.

The access control system may also comprise a user credential input device configured to, at least, receive a user credential. The user credential input device may also be configured to transmit the user credential over signal wires in a first data format in accordance with a standardized security protocol.

The splitter of the access control system may be electronically connected with the user credential input device utilizing a first set of power wires. The splitter may also be communicatively connected with the user credential input device utilizing a first set of signal wires and electronically connected with the access control board utilizing a second set of power wires. The splitter, and some examples, may also be communicatively connected with the access control board utilizing a second set of signal wires.

Process 1100 may begin at 1102, when the method transmits electrical power between the first set of power wires and the second set of power wires. For example, the splitter of the access control system may be electronically connected to one or more devices and transmit the electrical power through the splitter to those other devices.

At 1104, electronic signals may be transmitted between the first set of signal wires and the second set of signal wires. For example, the splitter may transmit the electronic signals between the first set of signal wires and the second set of signal wires to other devices. In some examples, the signal wires may transmit data along the signal wires.

At 1106, wireless signals comprising a user credential may be received. For example, the splitter may receive wireless signals at a wireless receiver communicatively coupled with the splitter. The wireless signals may comprise a user credential encoded in a second data format that is distinct from a first data format. In some examples, the second data format may comprise a near field communication (NFC) format and the first data format may comprise a Wiegand format.

At 1108, the user credential may be verified. For example, the splitter, access control board, or an authentication processor may verify that the user credential is permitted to access the location within a time range or is listed as a verified user credential on a list of user credentials. The authentication may be implemented as described throughout the disclosure.

At 1110, an access credential may be transmitted. For example, the splitter may access an accepted access credential from a memory of the splitter and pass the access credential to the access control board with the second set of signal wires. In some examples, the access control board may compare the received access credential with a stored and verified access credential. When the two match, the access credential may be authenticated or verified in addition to the user credential being authenticated or verified. The access control board may instruct the electrically-controlled device to allow access to the physical location.

Figure 12:
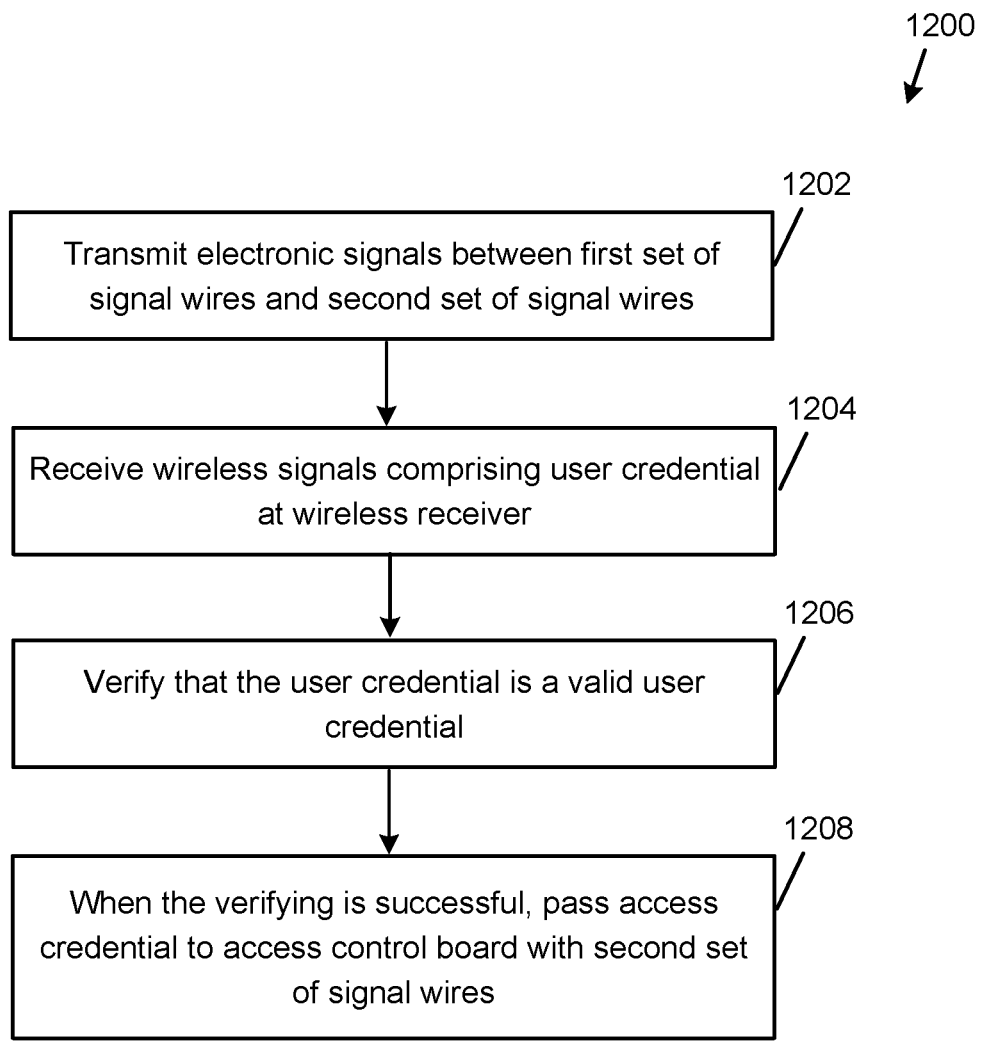
FIG. 12 illustrates an example flow diagram for granting access to location, according to an embodiment of the disclosure.

FIG. 12 illustrates an example flow diagram for granting access to location, according to an embodiment of the disclosure. The process 1200 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 1200 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 1200 of FIG. 12 may be performed by at least the one or more of the computing devices illustrated herein, including a splitter. The splitter may perform the physical actions of the process at a physical layer of the device (e.g., via electrical or signal wires), data link layer, transport layer, or application layer of the device. When performing actions at the application layer, the code may be stored on a computer-readable storage medium, for example, in the form of a computer program including a plurality of instructions executable by one or more processors. The computer-readable storage medium may be non-transitory.

Process 1200 may be performed by the splitter that is electronically connected with an access control system. The access control system may comprise various devices including the splitter, network-connected gateway, electrically-controlled device, access control board, and a user credential input device.

The electrically-controlled device may be configured to, at least in part, control access to physical location. For example, as described throughout the disclosure, the electrically-controlled device may correspond with a door, a gate, or other physical method of securing access to a physical location.

The access control system may also comprise an access control board. The access control board may be electronically coupled with the electrically-controlled device. The access control board may be configured to, at least, control the electrically-controlled device with one or more electronic signals. This may include activating a door latch relay or transmitting a request to unlock or lock a locking device associated with the physical location.

The access control system may also comprise a user credential input device configured to, at least, receive a user credential. The user credential input device may also be configured to transmit the user credential over signal wires in a first data format in accordance with a standardized security protocol.

The splitter of the access control system may be, in some examples, electronically connected with the user credential input device utilizing a first set of power wires and electronically connected with the network-connected gateway utilizing a second set of power wires. The splitter may be communicatively connected with the user credential input device utilizing a first set of signal wires and communicatively connected with the network-connected gateway utilizing a second set of signal wires.

In some examples, the power source for the access control board may be independent of an electrical power connection with the splitter. For example, the splitter may receive electrical power from the network-connected gateway and the access control board may receive electrical power from an AC to DC converter provided by a wall circuit.

Process 1200 may begin at 1202, when the method transmits electronic signals between the first set of signal wires in the second set of signal wires. For example, the splitter of the access control system may be communicatively connected to one or more devices and transmit the electronic signals through the splitter to those other devices.

At 1204, wireless signals may be received that comprise a user control. For example, the splitter may receive wireless signals at a wireless receiver communicatively coupled with the splitter. The wireless signals may comprise a user credential encoded in a second data format that is distinct from the first data format. In some examples, the second data format may comprise a wireless communication format and the first data format may comprise a Wiegand format.

At 1206, the user credential may be verified. For example, the splitter may verify that the user credential encoded in the second data format is a valid user credential. The verification may be in conjunction with a network-connected gateway of the splitter. The network may comprise any network discussed throughout the disclosure, including an Internet-connected gateway. In some examples, the network-connected gateway may be electronically connected with the splitter through a set of power wires and may also be communicatively coupled with the splitter through a set of signal wires.

The verification process may comprise, in some examples, comparing the received user credential with a list of valid user credentials. In some examples, the user credential may be valid for a time range between a start time and end time. When the current time is between the start time and the end time, the user credential may be validated.

At 1208, when the verifying is successful, an access credential may be passed to the access control board with the second set of signal wires. The access credential may correspond with the input device rather than a user device.

Figure 13:
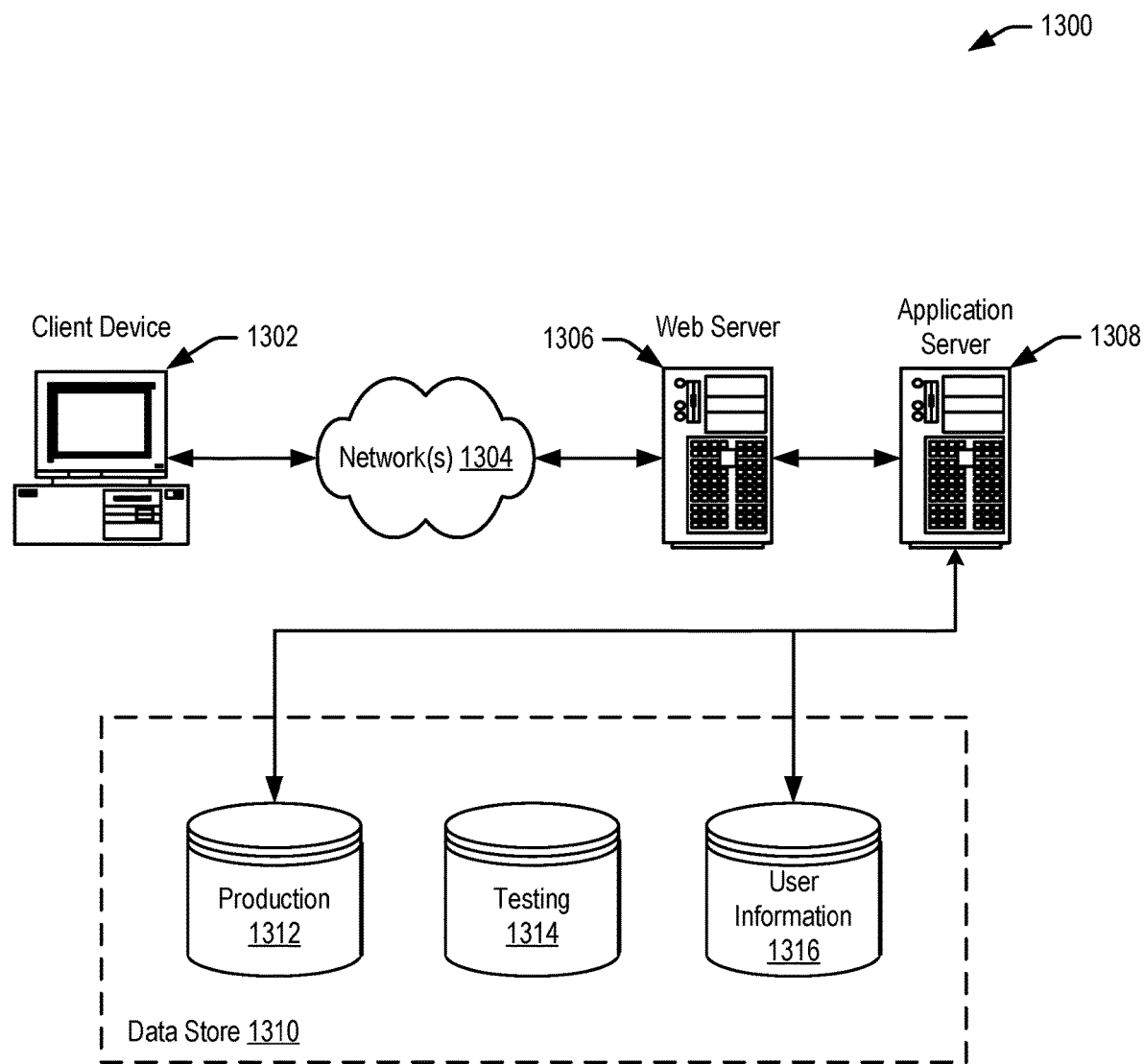
FIG. 13 illustrates an example environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server.

It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An access system, comprising:
   an electrically-controlled device configured to, at least in part, control access to a physical location;
   an access control board electronically coupled with the electrically-controlled device and configured at least to control the electrically-controlled device with one or more electronic signals;
   a user credential input device configured at least to receive a user credential and transmit the user credential over a first set of signal wires in a first data format in accordance with a standardized security protocol;
   a user credential user interface configured to:
   receive a valid time range for allowing access to the physical location; and
   update the user credential to correspond with the access to the physical location during the valid time range; and
   a splitter electrically connected with the user credential input device utilizing a first set of power wires, communicatively connected with the user credential input device utilizing the first set of signal wires, electrically connected with the access control board utilizing a second set of power wires, communicatively connected with the access control board utilizing a second set of signal wires, and configured at least to:
   transmit electrical power between the first set of power wires and the second set of power wires;
   transmit electronic signals between the first set of signal wires and the second set of signal wires;
   receive wireless signals at a wireless receiver communicatively coupled with the splitter, the wireless signals comprising a user credential encoded in a second data format distinct from the first data format;
   based at least in part on a comparison between a current time and the valid time range received from the user credential user interface, verify that the user credential encoded in the second data format is valid for a network-connected gateway; and when the verifying is successful, pass an access credential to the access control board with the second set of signal wires, wherein an existing set of power wires between the access control board and the user credential input device is utilized at least in part to create the first set of power wires between the splitter and the user credential input device, a first subset of power wires of the second set of power wires between the access control board and the network connected gateway, and a second subset of power wires of the second set of power wires between the network-connected gateway and the splitter, such that the access control board provides electrical power to the network-connected gateway, the splitter, and the user credential input device.

2. The access system of claim 1, wherein the first data format is a Wiegand format and the second data format is a according to a wireless communication protocol.

3. The access system of claim 1, wherein the user credential input device is a radio frequency identification (RFID) reader.

4. The access system of claim 1, wherein the user credential is a personal identification number (PIN) or user identifier associated with a portable user device and the access credential is associated with the user credential input device.

5. The access system of claim 1, wherein the standardized security protocol is a Wiegand protocol.

6. The access system of claim 1, wherein the electrical power comprises a 12 volt power source.

7. The access system of claim 1, wherein the wireless signals at the wireless receiver communicatively coupled with the splitter are received from a portable user device that transmits the user credential via a wireless communication network.

8. An access system, comprising:
an electrically-controlled device configured to, at least in part, control access to a physical location;
an access control board electronically coupled with the electrically-controlled device and configured at least to control the electrically-controlled device with one or more electronic signals;
a user credential input device configured at least to receive a user credential and transmit the user credential over a first set of signal wires in a first data format in accordance with a standardized security protocol;
a user credential user interface configured to:
receive a valid time range for allowing access to the physical location; and
update the user credential to correspond with the access to the physical location during the valid time range; and
a splitter communicatively connected with the user credential input device utilizing the first set of signal wires, communicatively connected with the access control board utilizing a second set of signal wires, and configured at least to:
transmit electronic signals between the first set of signal wires and the second set of signal wires;
receive wireless signals at a wireless receiver communicatively coupled with the splitter, the wireless signals comprising a user credential encoded in a second data format distinct from the first data format;
based at least in part on a comparison between a current time and the valid time range received from the user credential user interface, verify that the user credential encoded in the second data format is a valid user credential with a network-connected gateway of the splitter; and when the verifying is successful, passing an access credential to the access control board with the second set of signal wires;

wherein an existing set of power wires between the access control board and the user credential input device is utilized at least in part to create a first set of power wires between the access control board and the network-connected gateway, a second set of power wires between the network-connected gateway and the splitter, and a third set of power wires between the splitter and the user credential input device, such that the access control board provides electrical power to the network-connected gateway, the splitter, and the user credential input device.

9. The access system of claim 8, wherein the physical location comprises a building that affixed the user credential input device to the building.

10. The access system of claim 8, wherein the user credential is device-specific.

11. The access system of claim 8, wherein the splitter is further configured to:
receive a request to access the physical location from an application executed at a user device.

12. The access system of claim 8, wherein a wireless communication protocol intercepts a communication between a user device and the user credential input device, and wherein the communication comprises the user credential.

13. The access system of claim 8, wherein a request to access the physical location may be initiated through an radio frequency identification (RFID) request or through the splitter and the network-connected gateway of the splitter.

14. A computer-implemented method, comprising:
transmitting, by a splitter of an access system, electrical power utilizing an existing set of power wires between an access control board of the access system and an input device of the access system, the existing set of power wires comprising a first set of power wires and a second set of power wires, the first set of power wires electrically coupled with the input device and the splitter, a first subset of power wires of the second set of power wires electrically coupled with the access control board and a wireless receiver of the access system, and a second subset of power wires of the second set of power wires electrically coupled with the wireless receiver and the splitter, such that the access control board provides electrical power to the wireless receiver, the splitter, and the input device;
transmitting, by the splitter of the access system, electronic signals between a first set of signal wires and a second set of signal wires, the first set of signal wires communicatively coupled with the input device of the access system;
receiving wireless signals at the wireless receiver communicatively coupled with the splitter, the wireless signals comprising a user credential encoded in a second data format distinct from a first data format, the user credential being valid within a valid time range for allowing access to a physical location;
comparing a current time and the valid time range associated with the user credential;
based at least in part on the comparison of the current time and the valid time range associated with the user credential, transforming, by the splitter, the user credential from the second data format to the first data format, wherein the second data format comprises a digital certificate, and transforming the user credential comprises extracting data from the digital certificate using a hashing algorithm; and transmitting, by the splitter, the transformed user credential to an access control board of the access system with the second set of signal wires.

15. The computer-implemented method of claim 14, wherein the wireless signals at the wireless receiver communicatively coupled with the splitter are received from a portable user device that transmits the user credential via a near field communication (NFC) network.

16. The access system of claim 8, wherein the first set of power wires and the second set of power wires receive electrical power from the network-connected gateway of the splitter.

* * * * *